United States Patent [19]
Musto et al.

[11] Patent Number: 5,203,707
[45] Date of Patent: Apr. 20, 1993

[54] MODULAR FIRE TRAINER

[76] Inventors: Dominick J. Musto, 50 Louis Ave., Middlesex, N.J. 08846; William Rogers, 46 Elba Ave., Hopatcong, N.J. 07843; James J. Ernst, 20 Sherbrooke Pkwy., Livingston, N.J. 07039

[21] Appl. No.: 817,435

[22] Filed: Jan. 6, 1992

[51] Int. Cl.⁵ .............................................. G09B 9/00
[52] U.S. Cl. .................................................. 434/226
[58] Field of Search ................. 434/226; 52/79.2, 79.1

[56] References Cited

U.S. PATENT DOCUMENTS

| | | | |
|---|---|---|---|
| 3,292,327 | 12/1966 | Van Der Lely | 52/79.2 |
| 3,830,026 | 8/1974 | Tylius | 52/79.2 |
| 4,001,949 | 1/1977 | Francis | 434/226 |
| 4,526,548 | 6/1985 | Livingston | 434/226 |
| 4,861,270 | 8/1989 | Ernst et al. | 434/226 |

FOREIGN PATENT DOCUMENTS 0146465  6/1985  European Pat. Off. ............ 434/226

Primary Examiner—Gene Mancene
Assistant Examiner—Cindy A. Cherichetti
Attorney, Agent, or Firm—Richard T. Laughlin

[57] ABSTRACT

A modular fire fighter trainer for use in training fire fighters. This trainer includes at least one training subassembly or module having a training room with one or more simulated burnable items and having an equipment room with a burner control and a smoke generator, and includes a second control subassembly having a control room with a control panel connecting to the burner control and the smoke generator and includes a third interconnect subassembly having a hallway connecting to the training room and having an exterior doorway.

7 Claims, 2 Drawing Sheets

MODULAR FIRE TRAINER

The invention relates to a modular fire fighter trainer, and in particular the invention relates to a modular fire fighter trainer having one or more training compartment modules, a control room module, and at least one interconnect module.

BACKGROUND OF THE INVENTION

The prior art fire fighter trainer is described in U.S. Pat. No. 4,861,270 issued Aug. 29, 1989 and in U.S. Pat. No. 4,983,124 issued Jan. 8, 1991 which is a continuation-in-part of the aforementioned patent.

The prior art fire fighter trainer includes one or more training compartments having contents including one or more items chosen from a group of simulated burnable items including at least furniture and fixtures and equipment, a smoke generating means having an outlet disposed in the training compartment, a flame generating means having an outlet disposed in the training compartment, and a sensing and control means having a series of multisensor assemblies disposed in the training compartment and connecting to main control panel.

One problem with the prior art trainer is that it is necessary to provide one or more buildings for enclosing the training compartments. Another problem is that it is necessary to custom design each of the required buildings. A further problem is that the ratio of field labor to total field and shop labor is a relatively high ratio.

SUMMARY OF THE INVENTION

According to the present invention, a modular fire fighter trainer is provided. This trainer comprises three types of prefabricated building subassemblies. The trainer comprises one or more prefabricated training compartment building subassembly, each having a training compartment with one or more simulated burnable items, and also having an equipment room with a smoke generating means which has an outlet disposed in the training compartment and with a flame generating means which has an outlet disposed in the training compartment adjacent to each simulated burnable item. The trainer also comprises at least one prefabricated control room building subassembly, and comprises one or more prefabricated interconnect room building subassembly each having a stairway and door openings.

By using the prefabricated building subassemblies or modules, the prior art problem of providing a custom designed building for the training compartments, as required, is avoided. The problem of a relatively high ratio of field labor for field erection of the custom designed fire training building to total field and shop labor for installation of the modular fire fighter transfer is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
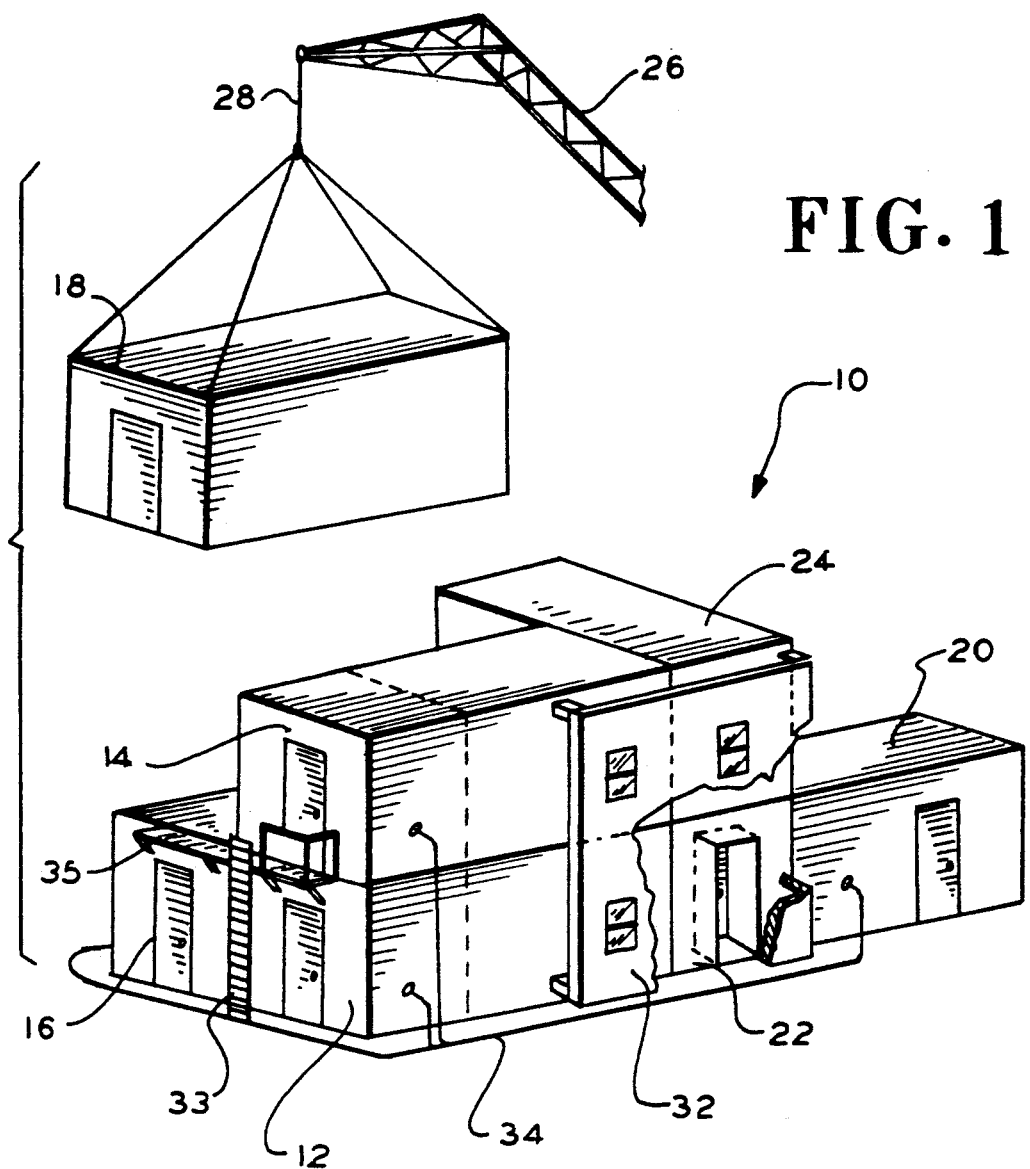
FIG. 1 is a perspective view of a modular fire fighter trainer according to the present invention.

As shown in FIG. 1, a modular fire fighter trainer or building assembly 10 is provided. Assembly 10 includes in this embodiment four training compartment subassemblies or modules 12, 14, 16, 18, and includes one control room subassembly or module 20, and includes two interconnect subassemblies or modules 22, 24. Other configurations using the same modules, or different modules, or a different number of modules, may be used to create a different training building assembly, or to vary the illustrated assembly. Training compartment module 12 is similar to modules 14, 16, 18, except that the simulated burnable items in each module may be different. Interconnect module 22 is similar to module 24. Trainer 10 is a prefabricated modularized live fire training device.

During construction of trainer or assembly 10, each of the modules 12, 14, 16, 18, 20, 22, 24 is lifted into place using a crane 26, which has a cable 28. In FIG. 1, crane 26 is shown lifting module 18 into the assembled position.

Assembly 10 may also have a facade 32 for providing a more realistic exterior surface, as required. Assembly 10 also has multi-conductor cables or electrical lines 34 to interconnect each training module to the control room module. Assembly 10 also has a ladder 33 and walkway 35 to access to modules 14, 18 at the rear thereof.

Figure 2:
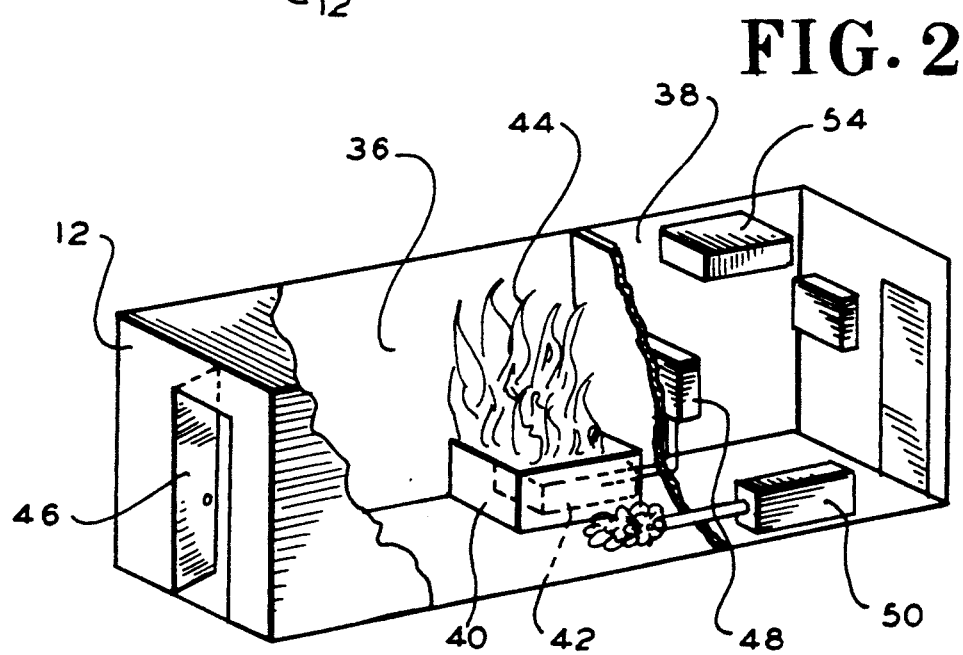
FIG. 2 is a cutaway perspective view of a portion of the trainer of FIG. 1.

As shown in FIG. 2, module 12 includes a training compartment or room 36 and an equipment compartment or room 38. Compartment 36 has a fireproof mockup device, or simulated burnable item 40 or other items. Item 40 is chosen from a group of simulated burnable items such as furniture and fixtures and equipment. Item 40 includes burner equipment 42 which emits flames 44, and which has extinguishing agent detectors and safety monitors (not shown). Compartment 36 has a training entrance doorway 46. The training entrance doorway 46 is designed to interconnect with a doorway of an interconnect module.

Equipment compartment 38 has a burner control enclosure 48. Enclosure 48 includes a pilot flame generator and pilot monitor, and control valves (not shown). Room 38 also has a smoke generator 50. Generator 50 has electronic components and interface connections (not shown). Room 38 also has a ventilation unit 54.

Figure 3:
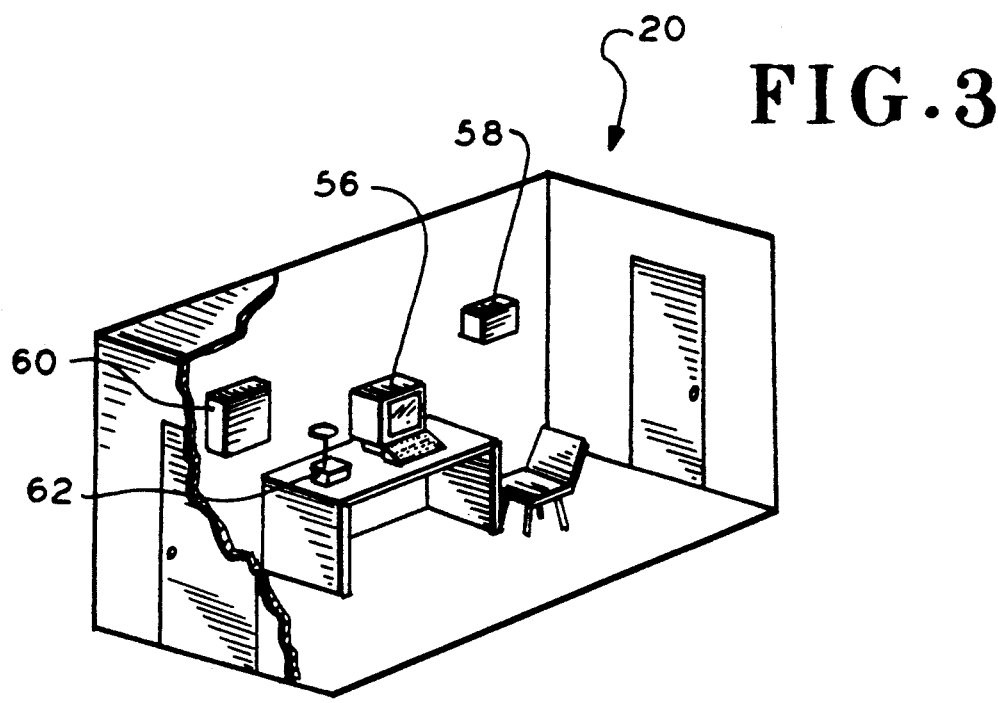
FIG. 3 is a cutaway perspective view of another portion of the trainer of FIG. 1.

As shown in FIG. 3, control room module 20 has an operator's control panel or console 56, monitoring equipment 58, safety equipment 60 and communication equipment 62.

Figure 4:
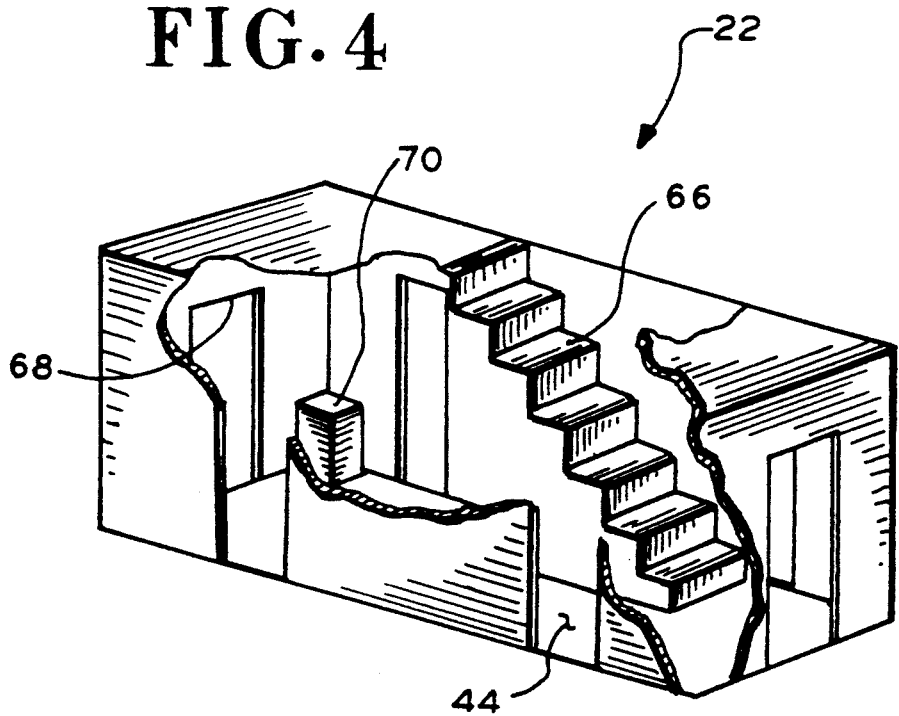
FIG. 4 is a cutaway perspective view of still another portion of the trainer of FIG. 1.

As shown in FIG. 4, interconnect module 22 which is similar to module 24, has a hallway 64, a stairway 66, and a typical doorway 68 which is one of six doorways in this particular case. Module 22 may have a passive structural piece 70, such as an electrical heater, or furniture piece, or the like. Interconnect modules 22 and 24 are designed so that training compartment modules, such as modules 12, 14, 16 and 18, can be connected to it, with doorways aligned, so as to form a fire fighter trainer where trainees can enter the trainer and search for and extinguish one or more fires as in an actual structural fire.

In summary, the invention relates to a fire fighter trainer 10, which has burner equipment 42 fueled by propane vapor or other fuel and which has one or more mockup devices or simulated burnable items 40 in order to simulate actual fires in such items. Trainer 10 is a modular fire fighter training assembly, having prefabricated subassemblies which can be easily transported by truck or rail and can be delivered at a construction site or facility and then assembled. The assembly 10, in this embodiment, includes four training subassemblies or modules 12, 14, 16, 18, and one control module 20, and two interconnect modules 22, 24.

Each of the modules 12, 14, 16, 18 contains one or more live fire training simulators or mockups, such as mockup 40 in room 36. Mockup 40 can generate flames 44 and sense the type of extinguishing agent being used. Equipment room 38 contains the smoke generator 50 and burner control equipment 48, which output in room 36. Equipment room 38 has interconnections (not shown) to electrical cable 34 and to a burner propane gas supply (not shown).

Training rooms 36 of modules 12, 14, 16, 18 contain one or more of the following types of fires:

Class A fires, such as a bedroom fire, or storage room fire, or a wood structure fire;

Class B fires, such as a spilled fuel fire, or kitchen grease fire;

Class C fires, such as an electrical panel fire or an electronics device fire, or a transformer fire; and Class D fires, such as a magnesium fire, or other like burning metal fire.

Control room module 20 has equipments 56, 58, 60, 62 which permit an instructor to control the fires and smoke in modules 12, 14, 16, 18 and the smoke in modules 22, 24. Panel 56 receives signals from extinguishing agent detectors and like detectors in each training room 36, and sends signals, as provided by the instructor, to the smoke generator 50 and burner control 48 and ventilators 54.

Interconnect modules 22, 24 each of which contains a hallway 64, a stairway 66 and doorways 68, serve to connect training compartments 36 of modules 12, 14, 16, 18, in order to form a complete trainer building assembly in which trainees can progress in search of fires as in a conventional training building.

Advantages of assembly 10 are indicated hereafter.

A) A combination building and mechanical and electrical system or assembly 10 consisting of prefabricated modules is provided.

B) The need for a custom designed building for the mechanical and electrical subsystems of trainer 10 is avoided.

C) The ratio of field labor to total field and shop labor to furnish a fire fighter trainer 10 at a construction site is minimized.

D) Various building layouts and shapes can be provided by combining and arranging and rearranging subassemblies or modules 12, 14, 16, 18, 20, 22, 24.

E) Trainer 10 can be expanded in the future using additional modules, like modules 12, 20, 22.

While the invention has been described in its preferred embodiment, it is to be understood that the words which have been used are words of description rather than limitation and that changes may be made within the purview of the appended claims without departing from the true scope and spirit of the invention in it broader aspects.

For example, propane liquid or natural gas, or the like, can be used in place of propane gas.

As another example, a manual type of control panel can be used in place of automatic control panel 56.

As a further example, each of the modules 12, 14, 16, 18, 20, 22, 24 can be shipped in pieces or sections and then assembled at the construction site to form prefabricated modules or subassemblies which can be assembled to form trainer 10, instead of shipping prefabricated modules 12, 14, 16, 18, 22, 22, 24 to the construction site which are assembled to form trainer 10.

What is claimed is:

1. A modular fire fighter trainer comprising:

a prefabricated first training compartment subassembly having a training compartment with at least one simulated burnable item with a burner; and with extinguishing agent detectors and safety monitors; and also having an equipment room with a smoke generator outputting into the training compartment and with a burner control connection to the burner, and having a ventilation system;

a prefabricated second control subassembly having a control room with a control unit for connection to the burner control enclosures and the smoke generators for operation by an instructor a prefabricated third interconnect subassembly having a hallway connecting to the training room and having an exterior doorway and having an interior stairway; and a prefabricated additional subassembly disposed above the prefabricated third interconnect subassembly and having access to said interior stairway.

2. A modular fire fighter trainer comprising:

a prefabricated first training compartment subassembly having a training compartment with at least one simulated burnable item with a burner; and with extinguishing agent detectors and safety monitors; and also having an equipment room with a smoke generator outputting into the training compartment and with a burner control connection to the burner, and having a ventilation system;

a prefabricated second control subassembly having a control room with a control unit for connection to the burner control enclosures and the smoke generators for operation by an instructor;

a prefabricated third interconnect subassembly having a hallway connecting to the training room and having an exterior doorway and having a stairway; and prefabricated fourth and fifth and sixth subassemblies structurally identical to the first training compartment subassembly; the fourth subassembly being disposed in one case above the first subassembly; and the fifth subassembly being disposed alongside the first subassembly; and the sixth subassembly being disposed above the fifth subassembly for providing a two-story trainer.

3. The trainer of claim 2, including:

a prefabricated seventh subassembly structurally identical to the third interconnect subassembly and disposed above the third interconnect subassembly and having a hallway connection to the training rooms of the fourth and sixth subassemblies, in one case.

4. The trainer of claim 3, wherein each of the various subassemblies is a prefabricated modularized subassembly having a size for positioning in place using a crane.

5. The trainer of claim 3, wherein each of the various subassemblies is a prefabricated unit having a size for shipping by truck to a construction site.

6. The trainer of claim 3 including:
interior or exterior multiconductor cables having respective conductors connecting to the various burner control enclosures and smoke generators from the control panel, for the purpose of permitting an instructor to control and monitor training exercises.

7. The trainer of claim 3, including:
a facade covering all or part of the exterior of the trainer assembly to enhance its appearance and training value.

* * * * *

UNITED STATES PATENT AND TRADEMARK OFFICE
CERTIFICATE OF CORRECTION

PATENT NO. : 5,203,707
DATED : April 20, 1993
INVENTOR(S) : Dominick J. Musto, et al.

It is certified that error appears in the above-indentified patent and that said Letters Patent is hereby corrected as shown below:

On the title page, insert the following:

[73] Assignee: Symtron Systems, Inc., Fair Lawn, NJ

Signed and Sealed this

Twenty-ninth Day of November, 1994

Attest:

BRUCE LEHMAN

*Attesting Officer*     *Commissioner of Patents and Trademarks*